United States Patent
Zhdanov

(10) Patent No.: US 9,964,653 B2
(45) Date of Patent: May 8, 2018

(54) METHOD OF TERRAIN CORRECTION FOR POTENTIAL FIELD GEOPHYSICAL SURVEY DATA

(71) Applicant: TechnoImaging, LLC, Salt Lake City, UT (US)

(72) Inventor: Michael S. Zhdanov, Holladay, UT (US)

(73) Assignee: TechnoImaging, LLC, Salt Lake City, UT (US)

(*) Notice: Subject to any disclaimer, the term of this patent is extended or adjusted under 35 U.S.C. 154(b) by 771 days.

(21) Appl. No.: 13/722,778

(22) Filed: Dec. 20, 2012

(65) Prior Publication Data

US 2013/0166212 A1 Jun. 27, 2013

Related U.S. Application Data

(60) Provisional application No. 61/578,571, filed on Dec. 21, 2011.

(51) Int. Cl.

| | |
|---|---|
| *G01V 1/30* | (2006.01) |
| *G01V 3/40* | (2006.01) |
| *G06F 17/16* | (2006.01) |
| *G01V 3/165* | (2006.01) |
| *G01V 7/00* | (2006.01) |

(52) U.S. Cl.
CPC .......... *G01V 1/30* (2013.01); *G01V 3/165* (2013.01); *G01V 3/40* (2013.01); *G01V 7/00* (2013.01); *G06F 17/16* (2013.01)

(58) Field of Classification Search
CPC . G01V 1/30; G01V 3/40; G01V 3/165; G01V 7/00; G06F 17/16

USPC ............................................................ 702/5
See application file for complete search history.

(56) References Cited

U.S. PATENT DOCUMENTS

| | | |
|---|---|---|
| 5,402,340 A | 3/1995 | White et al. |
| 6,430,507 B1 | 8/2002 | Jorgensen et al. |
| | (Continued) | |

OTHER PUBLICATIONS

Zhdanov, Michael. Integral Transforms in Geophysics, Springer-Verlag Berlin Heidelberg 1988.*

(Continued)

*Primary Examiner* — Yoshihisa Ishizuka
(74) *Attorney, Agent, or Firm* — Ray Quinney & Nebeker, PC; Paul N. Taylor

(57) ABSTRACT

A method for terrain correction of potential field geophysical survey data measured above an examined medium having density and/or magnetization is described, using potential field data including but not limited to gravity and/or magnetic total field and/or vector and/or tensor data. The potential field sensors may measure the gravity and/or magnetic total field and/or vector and/or tensor data at least one receiving position with respect to the examined medium. The terrain of the examined medium may be described by a spatially variable analytic function of the material properties of the examined medium. The terrain response for at least one component of the measured potential field in at least one receiver location (potential field data) may be calculated using special form of surface integral over the terrain based on 3D analog of the Cauchy-type integrals. This surface integration ensures accurate representation of the terrain response.

19 Claims, 11 Drawing Sheets

(56) References Cited

U.S. PATENT DOCUMENTS

| | | | |
|---|---|---|---|
| 2004/0172199 A1* | 9/2004 | Chavarria | G01V 1/28 702/14 |
| 2006/0036367 A1 | 2/2006 | Brewster | |
| 2009/0252372 A1 | 10/2009 | Davies | |
| 2009/0287464 A1 | 11/2009 | Barnes | |
| 2010/0094556 A1 | 4/2010 | Barnes et al. | |
| 2010/0206557 A1* | 8/2010 | Davies | 166/250.01 |
| 2011/0276320 A1* | 11/2011 | Krebs et al. | 703/6 |
| 2012/0232871 A1 | 9/2012 | Priezzhev et al. | |
| 2014/0129194 A1 | 5/2014 | Zhdanov | |

OTHER PUBLICATIONS

U.S. Appl. No. 61/578,571, filed Dec. 21, 2011, Zhdanov.
U.S. Appl. No. 61/721,832, filed Nov. 2, 2012, Zhdanov.
U.S. Appl. No. 61/721,864, filed Nov. 2, 2012, Zhdanov.
Ateya, I.L., et al., "Determination of density contrasts for a three-dimensional sub-surface intermediate layer", Earth panets and space 55, No. 8, (2003): pp. 463-471.
Jessell, M.W., "Forward modeling of three-dimensional geological and potential-field data", In 1996 SEG Annual Meeting, Society of Exploration Geophysicists, 1996; 1401-1403.
Jongmans D., et al., "Geophysical Investigation of Landslides: a review.", Bulletin de la Sociètè gèologique de France 178, No. 2 (2007: pp. 101-112.
Silva, J.B., et al., "Gravity inversion of basement relief and estimation of density contrast variation with depth", Geophysics 71, No. 5 (2006): J51-J58.
Xia, J., Inversion of gravity data with an exponential density contrast model: 62nd Annual International Meeting of the Society of Exploration Geophysicists, Extended Abstracts, 1992; pp. 525-528.
U.S. Appl. No. 14/071,326, Nov. 2, 2016, Office Action.

* cited by examiner

METHOD OF TERRAIN CORRECTION FOR POTENTIAL FIELD GEOPHYSICAL SURVEY DATA

CROSS-REFERENCE TO RELATED APPLICATIONS/PUBLICATIONS

This application claims the benefit of and priority to U.S. Provisional Application No. 61/578,571, filed Dec. 21, 2011, which is incorporated herein by reference in its entirety.

This application hereby incorporates the following publication by reference in its entirety: Zhdanov, M. S., 1988, Integral transforms in geophysics: Springer-Verlag, Berlin.

BACKGROUND OF THE INVENTION

1. The Field of the Invention

The present disclosure relates in general to methods of terrain correction for potential field geophysical survey data, particularly gravity and gravity gradiometry data.

2. The Related Technology

Potential field geophysical surveys are performed by measuring vector and/or tensors of a potential field, i.e., the first or second order spatial derivatives of the magnetic and/or gravity potentials. Potential field geophysical surveys are widely used for mapping subsurface geological and man-made structures in mineral, hydrocarbon, geothermal and groundwater exploration, and hydrocarbon, geothermal and groundwater resource monitoring, earth systems modeling, and tunnel and underground facility (UGF) detection.

Potential field geophysical data usually include at least one component of the gravity and/or magnetic vector and/or tensor fields. Measured potential field data contains the linear superposition of responses from both the terrain, and subsurface geological structures located beneath it.

To provide economical reconnaissance of subsurface geological structures, potential field sensors are often deployed from moving platforms such as airplanes, helicopters, airships, unattended aerial vehicles (UAV), borehole logging instruments, vessels, submarines, and vehicles.

For example, airborne potential field surveys from fixed wing aircraft typically acquire 500 line km of data each day, and airborne potential field surveys from helicopters typically acquire 200 line km of data each day. Airborne potential field surveys typically contain multiple survey lines draped over a variable terrain surface that aggregate as hundreds to thousands of line kilometers of potential field data measured every few meters and cover an area hundreds to thousands of square kilometers in size. The airborne platform's drape surface is constrained by the minimum ground clearance that the airborne platform is permitted to fly, and the maximum rate of climb or descent of the airborne platform relative to the terrain.

In practice, terrain measurements are usually embodied in Digital Elevation Models (DEM) as Easting (or Longitude), Northing (or Latitude) and Elevation constructed from the processing of (Differential) Global Position Systems ((D)GPS) and/or Radio Detection and Ranging (RADAR) and/or Laser Imaging Detection and Ranging (LIDAR) and/or Synthetic Aperture Radar (SAR) data measured from airborne platforms, or from pubic geospatial databases such as NASA's Shuttle Topography Radar Mission (SRTM).

The effect of terrain contributes to the measured potential field data. The effect of terrain actually dominates free-air gravity and gravity gradiometry data. To give an indication of the magnitude of the different responses in gravity gradiometry, a typical terrain response maybe in the order of hundreds of Eotvos (Eö), whereas the target response maybe in the order of tens of Eö.

After the potential field geophysical data have been acquired, a terrain correction needs to applied to compensate for the variations in topography (White et al., 1995, U.S. Pat. No. 5,402,340).

One method for terrain correction involves three-dimensional (3D) modeling of the potential field response in the spatial domain due to the DEM discretized using a regular or irregular grid of right rectangular prisms ("cells") bound above by the DEM, and below by a plane that passes through the lowest elevation of the DEM. Expressions for the potential field response of each cell contain volume integrals, and these may be evaluated using analytical or numerical techniques. The cells in the grid are usually populated with a constant physical property, e.g., a constant density of 2.67 g/cc corresponding to an average upper continental crust density. In some implementations, for example for sedimentary basins, the grid is populated with a spatially variable physical property, e.g., a density analytically increasing with depth corresponding to sediment compaction. To reduce computational requirements, the cell size is increased with increasing distance from the observation point (Brewster, 2006, US Patent Application US2006/0036367 A1; Davies, 2009, US Patent Application US2009/0252372 A1; Barnes, 2009, US Patent Application US2009/0287464 A1; Barnes et al., 2010, US Patent Application US 2010/0094556 A1; Davies, 2010, US Patent Application US 2010/0206557).

Another method for terrain correction involves three-dimensional (3D) modeling of the potential field response in the Fourier (or wavenumber) domain due to the DEM discretized using a polygon bound above by the DEM, and below by a plane that passes through the lowest elevation of the DEM. Expressions for the potential field response of each cell contain Fourier transforms, and these may be evaluated using numerical techniques such as Fast Fourier Transforms (FFTs). The polygon is usually populated with a constant physical property, e.g., a constant density of 2.67 g/cc corresponding to an average upper continental crust density. In some implementations, for example for sedimentary basins, the polygon is populated with a spatially variable physical property, e.g., a density analytically increasing with depth corresponding to sediment compaction.

The accuracies of these terrain corrections are limited by numerical considerations, such as the discretization of the cells, accuracy of the volume integration, and accuracy of the Fourier transforms used. Accurate terrain corrections are computationally time consuming.

Despite improved navigation, instrumentation, and data processing techniques, there remains a need for improved terrain correction techniques for potential field geophysical data. This will be more important as next generation of potential field instruments such as very low noise (e.g., 1 Eö/√Hz) gravity gradiometers are currently being developed and tested.

BRIEF SUMMARY

The embodiments disclosed herein are related to systems, methods, and computer readable medium for terrain correction for potential field geophysical data measured from at least one potential field sensor at at least one measurement position based on representation of the terrain response as a 3D Cauchy-type surface integral over the topography of the earth surface. In the systems, methods, and computer readable medium at least one component of gravity and/or magnetic scalar, vector, and/or tensor data with at least one potential field sensor in at least one measurement position along at least one survey line is measured. The terrain as a digital elevation model is also measured. An appropriate physical property function to describe the physical property distribution within the terrain is selected. The terrain response from the digital elevation model with a physical property function for the at least one component of gravity and/or magnetic vector and/or tensor data with at least one potential field sensor in at least one measurement position along at least one survey line, using 3D Cauchy-type surface integral over the terrain surface is forward modeled. The system terrain response for the at least one component of gravity and/or magnetic vector and/or tensor data with at least one potential field sensor in at least one measurement position along at least one survey line is calculated. The terrain corrected potential field data is also calculated.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
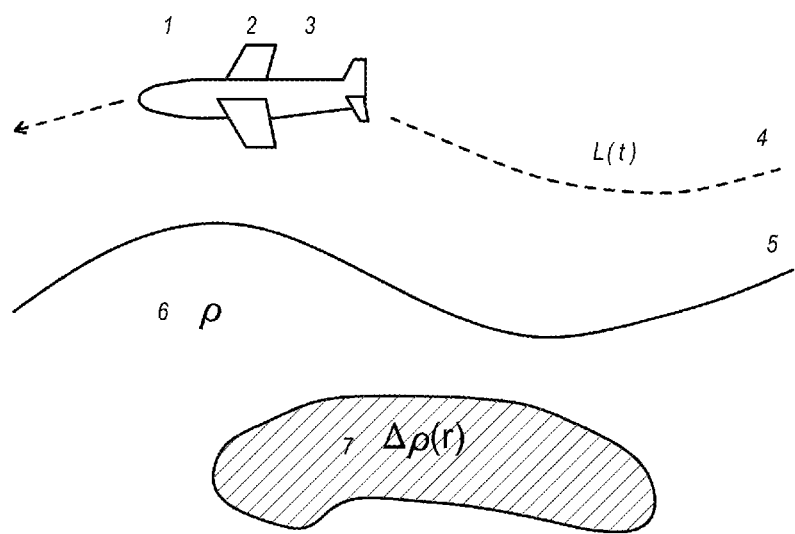
FIG. 1 illustrates an embodiment of a system for terrain correction of gravity and gravity gradiometry data including gravimeters and gravity gradiometers attached to a fixed wing aircraft that is moving along a survey line L(t) above the surface of the examined medium.

Potential field geophysical surveys may encompass marine, borehole, ground and airborne potential field measurements from moving platforms such as but not limited to airplanes, helicopters, airships, unattended aerial vehicles (UAV), borehole logging instruments, vessels, submarines, and other vehicles.

Potential field geophysical data usually includes at least one component of the gravity and/or magnetic vector and/or tensor. Potential field vector data may be directly measured as either at least one vector component (e.g., vertical gravity component as measured by a gravimeter) or as the magnitude of the total field (e.g., total magnetic intensity as measured by an optically pumped magnetometer), or indirectly calculated from potential field tensor data. Potential field tensor data may be directly measured (e.g., magnetics tensors as measured by a SQUID magnetic gradiometer) or indirectly calculated from potential field vector data. Potential field tensor data may also be approximated by directly and simultaneously measuring at least one component of the potential field using at least two spatially separated instruments measuring at least one vector component of the potential field (e.g., magnetic tensor as approximated by the gradient computed between total magnetic intensities as measured by two spatially separated optically pumped magnetometers).

Measured potential field data contains the linear superposition of responses from both the terrain and the subsurface geological structures located beneath it.

For the purpose of interpreting potential field data, the terrain response is calculated using special form of surface integral over the surface of the elevation model based on 3D analog of the Cauchy-type integrals. This surface integration ensures accurate representation of the terrain response.

The computed terrain response is filtered to match the potential field instrument's system and data processing response. For example, the system and data processing response of airborne gravity gradiometers can be effectively emulated with a sixth or seventh order low-pass Butterworth filter of length between 100 m and 1000 m.

The system filtered terrain response is subtracted from the measured potential field data. For example, for gravity gradiometry, the system filtered terrain response should be calculated and subtracted from the measured free-air gravity gradiometry data.

In at least one embodiment of a method disclosed herein, the terrain correction can be applied to gravity vector data measured with a gravimeter, or calculated from data measured with a gravity gradiometer.

In at least one embodiment of a method disclosed herein, the terrain correction can be applied to gravity tensor data measured with a gravity gradiometer, or calculated from data measured with a gravimeter.

In at least one embodiment of a method disclosed herein, the terrain correction can be applied to magnetic vector data, including total magnetic intensity, measured with a magnetometer, or calculated from data measured with a magnetic gradiometer.

In at least one embodiment of a method disclosed herein, the terrain correction can be applied to magnetic tensor data measured using a magnetic gradiometer, or calculated from data measured with a magnetometer.

At least one embodiment of a method disclosed herein, can be applied for subsurface imaging of geological and/or man-made structures for mineral, hydrocarbon, geothermal and groundwater exploration, in-situ mining, hydrocarbon, geothermal and groundwater resource monitoring, and tunnel and UGF detection, using potential field geophysical data measured from at least one moving platform such as but not limited to airplanes, helicopters, airships, UAV, borehole logging instruments, vessels, submarines, and vehicles.

At least one embodiment of this method can be used in geophysical exploration for mineral, hydrocarbon, geothermal, and groundwater resources.

At least one embodiment of this method can be used in geophysical monitoring for in-situ mining, hydrocarbon, geothermal, and groundwater resources.

At least one embodiment of this method can be used in geophysical monitoring for earth systems.

At least one embodiment of this method can be used for tunnels and UGF detection.

One embodiment of a system for terrain correction of gravity and gravity gradiometry data is illustrated in FIG. 1. A data acquisition system 1, located on a fixed wing aircraft 2, may include gravimeters and/or gravity gradiometers 3 attached to the fixed wing aircraft that is moving along a survey line L(t) 4 at some elevation above the surface of an examined medium 5 that may be characterized by a homogeneous terrain density 6 with an anomalous density distribution 7 superimposed upon it.

Figure 2:
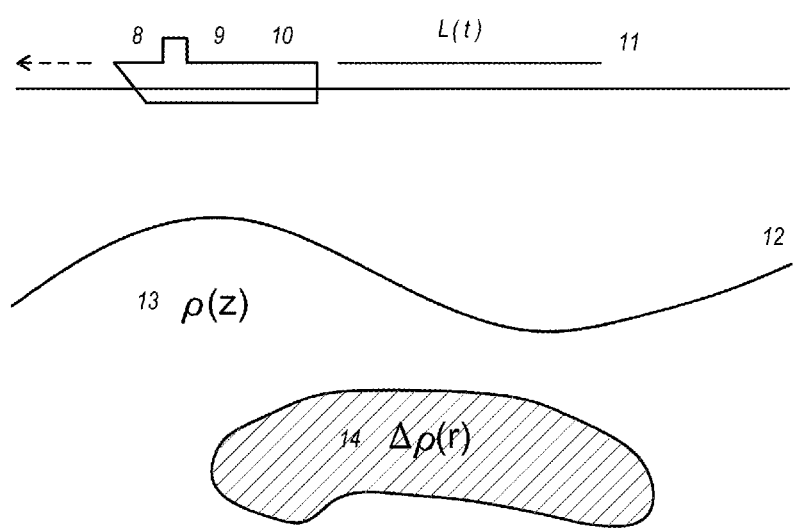
FIG. 2 illustrates an embodiment of a system for terrain correction of gravity and gravity gradiometry data including gravimeters and gravity gradiometers attached to a vessel moving at some elevation along a survey line L(t) above the surface of the examined medium.

Another embodiment of a system for terrain correction of gravity and gravity gradiometry data is illustrated in FIG. 2. A data acquisition system 8, located on a vessel 9, may include gravimeters and/or gravity gradiometers 10 attached to the vessel that is moving along a survey line L(t) 11 at some elevation above the surface of an examined medium 12 that may be characterized by a terrain density that varies as a function of depth 13 with an anomalous density distribution 14 superimposed upon it.

Figure 3:
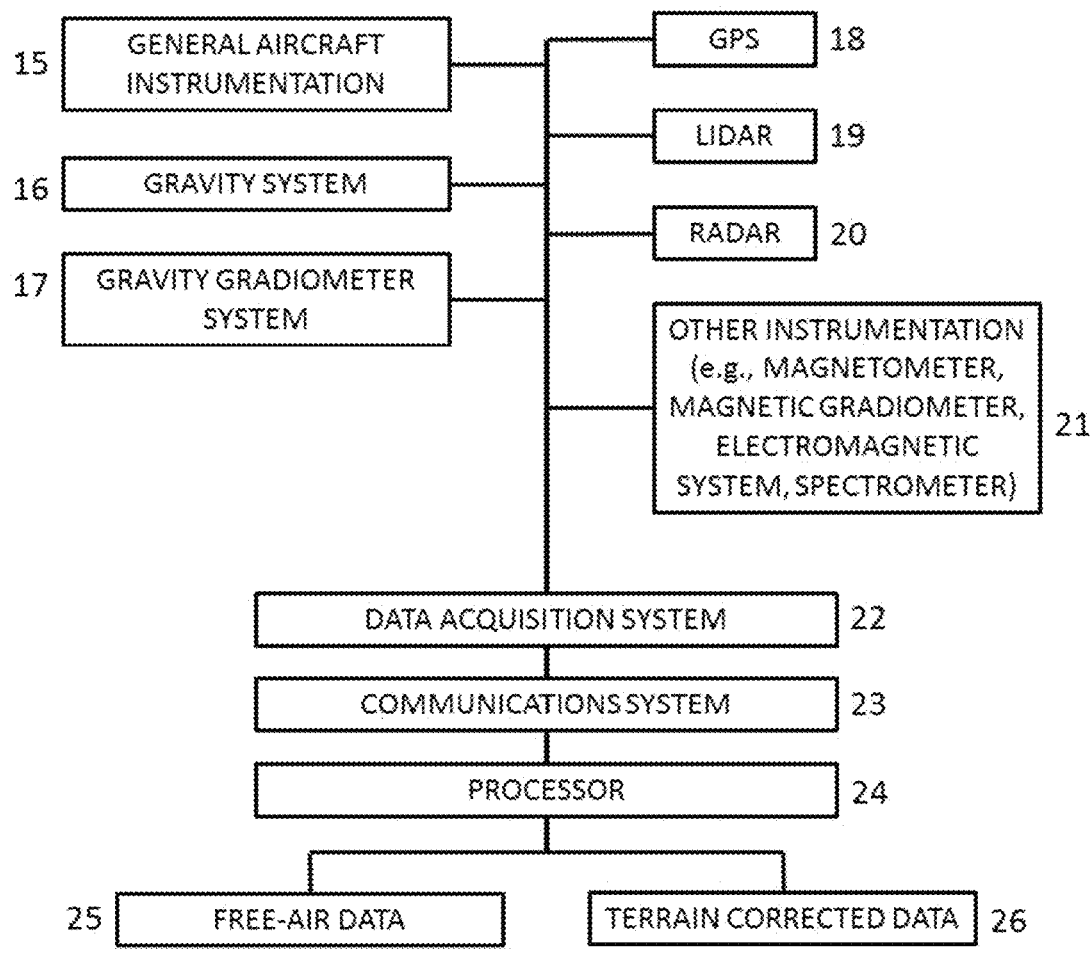
FIG. 3 illustrates an embodiment of a system for terrain correction of gravity and gravity gradiometry data from a fixed wing aircraft.

An embodiment of a system for terrain correction of gravity and/or gravity gradiometry data from a fixed wing aircraft is illustrated in FIG. 3. The real time volume imaging system may include general aircraft instrumentation 15, gravity system (e.g., gravimeter) 16, gravity gradient system (e.g., gravity gradiometer) 17, global positioning system (GPS) 18, LIDAR altimetry 19, radar altimetry 20, other geophysical sensor systems including but not limited to magnetometers, magnetic gradiometers, natural source electromagnetic systems, controlled-source electromagnetic systems, and spectrometers 21, data acquisition system 22, communications system 23, and processor 24, which collectively can produce free air gravity and/or gravity gradiometry data 25 and terrain corrected gravity and/or gravity gradiometry data 26.

Figure 4:
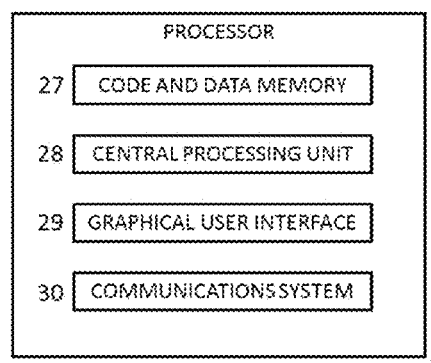
FIG. 4 illustrates an embodiment of a processor for terrain correction of gravity and gravity gradiometry data.

An embodiment of a processor 24 is illustrated in FIG. 4. The processor 24 may include, for example, a data and code memory 27 for storing free-air gravity and/or gravity gradiometry data from the data acquisition system 22 via the communications system 23, terrain correction computer software and terrain corrected gravity and/or gravity gradiometry data, a central processing unit 28 for executing the terrain correction computer software on the free-air gravity and/or gravity gradiometry data to generate terrain corrected gravity and/or gravity gradiometry data, a graphical user interface (GUI) 29 for displaying the free-air and/or terrain corrected gravity and/or gravity gradiometry data, and a communications system 30 for system interoperability. The processor 24 may comprise of a single processing unit or can be distributed across one or more processing units in one or more locations. The communications system 23 can include I/O interfaces for exchanging information with one or more external devices. The data and code memory 27 may comprise of a single memory device or can be distributed across one or more memory devices in one or more locations connected via the communications system 23.

Figure 5:
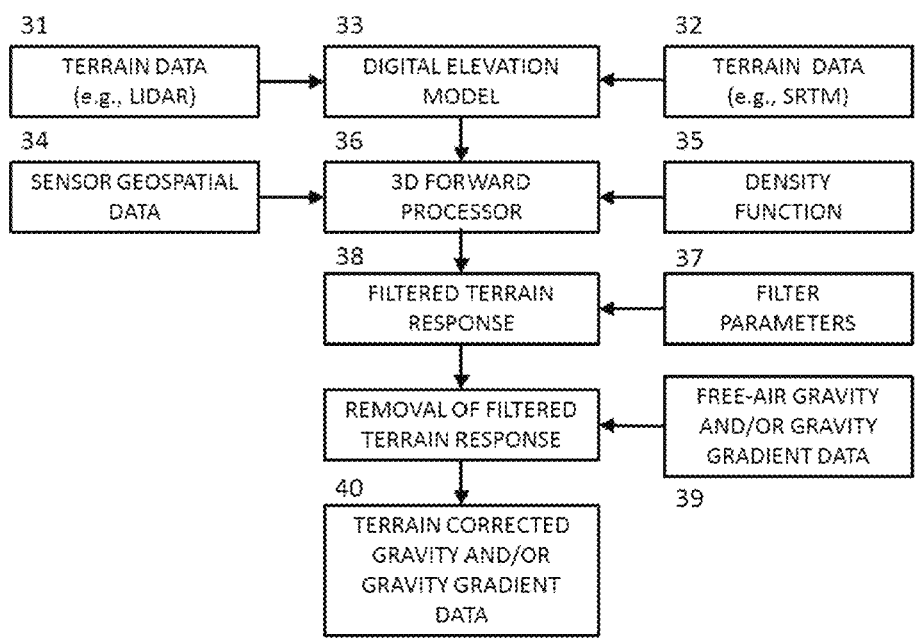
FIG. 5 illustrates an embodiment of a method for terrain correction of gravity and gravity gradiometry data.

An embodiment of a method for terrain correction of gravity and/or gravity gradiometry data is schematically shown in FIG. 5. The processor 24 may merge high resolution terrain data such as that obtained from LiDAR measurements during a survey 31 and low resolution terrain data, such as that obtained from a public geospatial database such as SRTM 32 to form a digital elevation model 33 of the survey area and an area 10 km (or other area size) from the perimeter of the survey area. The processor 24 may also read the gravimeter's and/or gravity gradiometer's geospatial data 34 that is processed from the aircraft's navigation instrumentation. A terrain density function 35 is selected by the user, and may be expressed by any analytic function. A 3D forward processor 36 may compute the predicted terrain response. The gravimeter's and/or gravity gradiometer's system responses are emulated as a low-pass filter 37 whose parameters are chosen by the user. The processor 24 may low pass filter the predicted terrain response to produce a filtered terrain response 38 that would be measured by the gravimeters and/or gravity gradiometers. The processor 24 may read the free-air gravity and/or gravity gradiometry data 39 and subtract the filtered terrain response 38 to produce terrain corrected gravity and/or gravity gradiometry data 40.

The 3D forward processor 36 computes the gravity and/or gravity gradiometry responses using Cauchy-type integral representations of the gravity and/or gravity gradient fields for the density contact surface.

The concept of a three-dimensional Cauchy-type integral was introduced by Zhdanov, 1988, and is represented by the following expression:

$$C^S(r, \varphi) = -\frac{1}{4\pi} \int \int_S \left[ (n \cdot \varphi) \nabla \frac{1}{|r-r'|} + (n \times \varphi) \times \nabla \frac{1}{|r-r'|} \right] ds, \quad (1)$$

where S is some closed surface, $\varphi = \varphi(r)$ is some vector function specified on S and is continuous on S, and n is a unit vector of the normal to S directed outside the domain D, bounded by the surface S. Function $\varphi$ is called a vector density of the Cauchy-type integral $C^S(r, \varphi)$.

The Cauchy-type integral $C^S(r, \varphi)$ can be represented in matrix notation. The vectors $C^S$, $\varphi$, n, and $$\nabla \frac{1}{|r-r'|}$$

are presented in some Cartesian basis $\{d_x, d_y, d_z\}$, where the z axis is directed upward, as:

$$C^S = C_\alpha^S d_\alpha$$

$$\varphi = \varphi_\beta d_\beta$$

$$n = n_\gamma d_\gamma$$

-continued
$$\nabla \frac{1}{|r-r'|} = -\frac{r-r'}{|r-r'|^3} = -\frac{r_\eta - r'_\eta}{|r-r'|^3} d_\eta$$

where $r_\eta = \eta$ and $\alpha$, $\beta$, $\gamma$, $\eta = x, y, z$, and where we use an agreement on summation that the twice recurring index indicates the summation over this index. Using these notations, equation (1) can be re-written as:

$$C^S(r,\varphi) = -\frac{1}{4\pi} \int\int_S \Delta_{\alpha\beta\gamma\eta} \varphi_\beta \frac{r_\eta - r'_\eta}{|r-r'|^3} n_\gamma ds, \quad (2)$$

where the four-index $\Delta$-symbol is expressed in terms of the symmetric Kronecker symbol $\delta_{\alpha\beta}$:

$$\Delta_{\alpha\beta} = \delta_{\alpha\beta}\delta_{\gamma\eta} + \delta_{\alpha\eta}\delta_{\beta\gamma} - \delta_{\alpha\gamma}\delta_{\beta\eta},$$

$$\delta_{\alpha\beta} = \begin{cases} 1, & \alpha = \beta, \\ 0, & \alpha \neq \beta. \end{cases}$$

Figure 6:
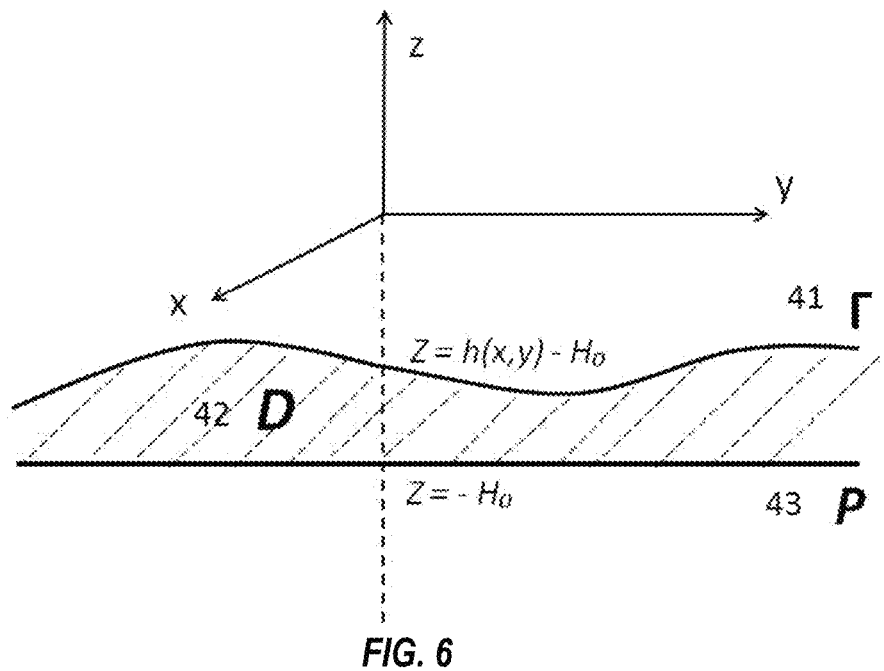
FIG. 6 illustrates the 3D earth model used for calculating the terrain response of the measured gravity and gravity gradiometry data.

As illustrated in FIG. 6, we can consider a model with the density contrast at some surface F 41, representing the topography of the earth's surface, i.e., the terrain. We can consider a domain D 42 that is infinitely extended in the horizontal directions bounded by the surface F, described by equation $z=h(x,y)-H_0$, and a horizontal plane P 43, $z=h_0$, where $H_0 \geq h(x,y) \geq 0$ and:

$$h(x,y) - H_0 \to 0 \text{ for } \sqrt{x^2 + y^2} \to \infty,$$

where $H_0$ is a constant.

It can be shown that the gravity field, g, of the infinitely extended domain can be represented by the following Cauchy-type integral:

$$g(r') = 4\pi\gamma\rho_0 C^\Gamma(r',(z+H_0)d_z),$$

which can be re-written using matrix notation for the Cauchy integral from equation 2:

$$g_\alpha(r') = -\gamma\rho_0 \int\int_S \Delta_{\alpha\beta\gamma\eta}(z+H_0) \frac{r_\eta - r'_\eta}{|r-r'|^3} n_\gamma ds. \quad (3)$$

Similarly, the gravity gradients can be expressed in matrix notation for the Cauchy integral from equation 2:

$$g_{\alpha\nu}(r') = \frac{\partial g_\alpha(r')}{\partial r'_\nu} = \quad (4)$$
$$-\gamma\rho_0 \int\int_S \Delta_{\alpha\beta\gamma\eta} \frac{(z+H_0)}{|r-r'|^5}[3(r_\nu - r'_\nu)(r_\eta - r'_\eta) + |r-r'|^2 \delta_{\nu\eta}] n_\gamma ds.$$

We can provide explicit expressions for the components of the gravity and gravity gradients of the density contrast surface, taking into account the following relations for the components of the unit normal vector to the surface $\Gamma$:

$$n_x ds = -\frac{\partial h(x,y)}{\partial x} dx dy = b_x(x,y) dx dy, \quad (5)$$

-continued
$$n_y ds = -\frac{\partial h(x,y)}{\partial y} dx dy = b_y(x,y) dx dy,$$

$$n_z ds = b_z(x,y) dx dy,$$

$$(z+H_0) = h(x,y),$$

where:

$$b_x(x,y) = -\frac{\partial h(x,y)}{\partial x},$$

$$b_y(x,y) = -\frac{\partial h(x,y)}{\partial y},$$

$$b_z(x,y) = 1.$$

Substituting equations (5) into equations (3) and (4), we obtain:

$$g_\alpha(r') = -\gamma\rho_0 \int\int_S \Delta_{\alpha\beta\gamma\eta} h(x,y) \frac{\tilde{r}_\eta - r'_\eta}{|\tilde{r}-r'|^3} b_\gamma(x,y) dx dy, \quad (6)$$

for the gravity field, and:

$$g_{\alpha\nu}(r') = -\gamma\rho_0 \int\int_S \Delta_{\alpha\beta\gamma\eta} \frac{h(x,y)}{|\tilde{r}-r'|^5}[3(\tilde{r}_\nu - r'_\nu)(\tilde{r}_\eta - r'_\eta) + |\tilde{r}-r'|^2 \delta_{\nu\eta}] \quad (7)$$
$$b_\gamma(x,y) dx dy.$$

for the gravity gradients, where:

$$|\tilde{r}-r'| = \sqrt{(x-x')^2 + (y-y')^2 + (h(x,y)-H_0-z')^2},$$

$$\tilde{r}_x = x,$$

$$\tilde{r}_y = y,$$

$$\tilde{r}_z = h(x,y) - H_0.$$

For sedimentary basins, terrain (or bathymetry) corrections are generally calculated as the response due to the volume of earth bound by an upper surface of the digital elevation (or bathymetry) model and a lower surface of a plane at depth. To simulate sediment compaction and diagenesis causing a loss of porosity, densities are often parameterized from empirical observations using analytic density-depth functions obtained from with the terrain (or bathymetry) forming the datum. The variety of analytic density-depth functions in use span linear, quadratic, parabolic, exponential, hyperbolic, and polynomial functions. In general, the terrain can be estimated with a model having a vertically variable density:

$$\rho = \rho(z).$$

It can be shown that the gravity field, g, of an infinitely extended domain can be represented as the following Cauchy-type integral:

$$g(r') = 4\pi\gamma\rho_0 C^\Gamma(r'[R(z) - R(-H_0)]d_z), \quad (8)$$

where $R(z)$ is the indefinite integral of density:

$$R(z) = \int \rho(z) dz.$$

Equation (8) can be re-written using matrix notation for the Cauchy integral from equation 2:

$$g_\alpha(r') = -\gamma\rho_0 \int\int_S \Delta_{\alpha\beta\gamma\eta}[R(z) - R(-H_0)]\frac{r_\eta - r'_\eta}{|r-r'|^3}n_\gamma ds. \quad (9)$$

Similarly, the gravity gradients can be expressed in matrix notation for the Cauchy integral from equation 2:

$$g_{\alpha\nu}(r') = \frac{\partial g_\alpha(r')}{\partial r'_\nu} = \quad (10)$$

$$\gamma\rho_0 \int\int_S \Delta_{\alpha\beta\gamma\eta}\frac{[R(z) - R(-H_0)]}{|r-r'|^5}[3(r_\nu - r'_\nu)(r_\eta - r'_\eta) + |r-r'|^2 \delta_{\nu\eta}]$$

$$n_\gamma ds.$$

One can derive explicit expressions for the gravity fields and their gradients of the density contact surface, taking into account Equations (5) for the components of the unit normal vector to the surface, F:

$$g_\alpha(r') = -\gamma\rho_0 \int\int_S \Delta_{\alpha\beta\gamma\eta}[R(z) - R(-H_0)]\frac{\tilde{r}_\eta - r'_\eta}{|\tilde{r}-r'|^3}b_\gamma ds, \quad (11)$$

and $$g_{\alpha\nu}(r') = \frac{\partial g_\alpha(r')}{\partial r'_\nu} = \quad (12)$$

$$\gamma\rho_0 \int\int_S \Delta_{\alpha\beta\gamma\eta}\frac{[R(z) - R(-H_0)]}{|\tilde{r}-r'|^5}[3(\tilde{r}_\nu - r'_\nu)(\tilde{r}_\eta - r'_\eta) + |\tilde{r}-r'|^2 \delta_{\nu\eta}]$$

$$b_\gamma(x,y)ds.$$

As an example of an embodiment of the method, one can consider a terrain with linear variations in the density with depth:

$$\rho(z) = \rho_0 + \alpha z,$$

such that:

$$R(z) = \rho_0 z + \frac{1}{2}\alpha z^2.$$

As another example of an embodiment of the method, one can consider a terrain with exponential variations in the density with depth:

$$\rho(z) = \rho_0 + \alpha\exp(kz),$$

such that:

$$R(z) = \rho_0 z + \frac{a}{k}\exp(kz).$$

In one embodiment of this invention, the surface Cauchy-type integral equations 6 and 7 may be discretized by dividing the horizontal integration plane XY into a rectangular grid of $N_m$ cells with constant discretization of $\Delta x$ and $\Delta y$ in the x and y directions, respectively. In each cell $P_k$ ($k=1, 2, \ldots, N_m$), it is assumed that the corresponding part of the density contrast surface can be represented by an element of a plane described by the following equation:

$$z = h(x,y) - H_0 = h^{(k)} - b_x^{(k)}(x-x_k) - b_y^{(k)}(y-y_k) - H_0,$$

where $(x,y) \in P_k$ and $(x_k, y_k)$ denotes the center of the cell $P_k$. In this case:

$$b_x(x,y) = b_x^{(k)},$$

$$b_y(x,y) = b_y^{(k)},$$

$$b_z(x,y) = b_z^{(k)} = 1.$$

where $(x,y) \in P_k$. Equation 6 for the gravity field now may take the form:

$$g_\alpha(r') = -\gamma\rho_0 \sum_{k=1}^{N_m} \int_{P_k}\int \Delta_{\alpha\beta\gamma\eta} h(x,y)\frac{\tilde{r}_\eta - r'_\eta}{|\tilde{r}-r'|^3}b_y^{(k)}dxdy. \quad (13)$$

Using the discrete model parameters introduced above, and discrete gravity data, $g_\alpha(r')$, we can represent the 3D forward modeling operator for the gravity field of the density contrast surface Γ, equation 8, as:

$$g_\alpha(r') = \sum_{k=1}^{N_m} f_{\alpha\gamma}^{(nk)} h^{(k)} b_y^{(k)}, \quad (14)$$

where:

$$f_{\alpha\gamma}^{(nk)} = -\gamma\rho_0 \Delta_{\alpha\beta\gamma\eta}\frac{\tilde{r}_\eta^{(k)} - r_\eta^{(n)'}}{|\tilde{r}_k - r'_\eta|^3}\Delta x \Delta y,$$

and:

$$|\tilde{r}-r'| = \sqrt{(x_k - x_n')^2 + (y_k - y_n')^2 + (h^{(k)} - H_0 - z_n')^2},$$

$$\tilde{r}_x^{(k)} = x_k,$$

$$\tilde{r}_y^{(k)} = y_k,$$

$$\tilde{r}_z^{(k)} = h^{(k)} - H_0.$$

$$\tilde{r}_x^{(n)'} = x_n',$$

$$\tilde{r}_y^{(n)'} = y_n',$$

$$\tilde{r}_y^{(n)'} = y_n',$$

In a similar manner, the discrete form of equation 7 for the gravity gradients may be written as:

$$g_{\alpha\nu}(r') = \gamma\rho_0 \quad (15)$$

$$\sum_{k=1}^{N_m}\int_{P_k}\int \Delta_{\alpha\beta\gamma\eta}\frac{h(x,y)}{|\tilde{r}-r'|^5}[3(\tilde{r}_\nu - r'_\nu)(\tilde{r}_\eta - r'_\eta) + |\tilde{r}-r'|^2 \delta_{\nu\eta}]b_y^{(k)}dxdy.$$

Using the discrete model parameters introduced above, and discrete gravity gradiometry data, $g_{\alpha\nu}(r')$, we can represent the 3D forward modeling operator for the gravity gradients of the density contrast surface Γ, equation 15, as:

$$g_{\alpha\nu}(r') = \sum_{k=1}^{N_m} F_{\alpha\nu\gamma}^{(nk)} h^{(k)} b_\gamma^{(k)}, \qquad (16)$$

where:

$$F_{\alpha\nu\gamma}^{(nk)} = \gamma\rho_0 \Delta_{\alpha\beta\gamma\eta} \frac{1}{|\tilde{r}_k - r'_\eta|^5} [3(\tilde{r}_\nu - \tilde{r}_\nu^{(n)\prime})(\tilde{r}_\eta - \tilde{r}_\eta^{(n)\prime}) + |\tilde{r}_k - r'_\eta|^2 \delta_{\nu\eta}]\Delta x \Delta y,$$

In another embodiment of this invention, we may assume that the function h(x,y) describing the density contrast surface $\Gamma$ is given on a rectangular mesh $\Sigma$:

$$\sum = \left\{ (x_i, y_j) \begin{array}{ll} x_1 = x' & x_I = x'' & x_{i+1} = x_i + \Delta x \\ y_1 = y' & y_J = y'' & y_{j+1} = y_j + \Delta y \end{array} \right\}$$

where i=1, 2, . . . , I and j=1, 2, . . . , J. In this case, the coordinates of the points located on the surface $\Gamma$, $\tilde{r}_k = \tilde{r}_{ij} \in \Gamma$, are as follows:

$$\tilde{r}_k = (x_k, y_k, h^{(k)} - H_0) = (x_i, y_j, h^{(ij)} - H_0) = \tilde{r}_{ij},$$

where $h^{(k)} = h^{(ij)} = h(x_i, y_j)$. Note that the nodes of the mesh are consecutively numbered along the horizontal and vertical directions. For the given numbering of the nodes, k=1, 2, . . . , K, where K=IJ, one can establish a simple one-to-one relationship between the index n and the double integer (i,j):

$$k = i + (j-1)K.$$

Figure 7:
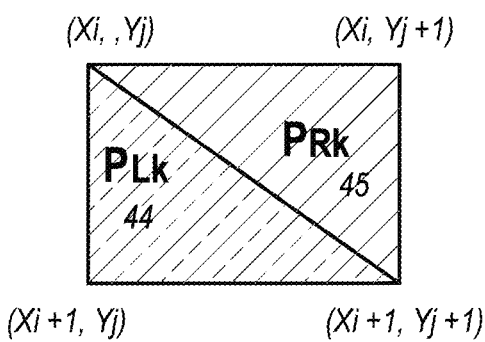
FIG. 7 illustrates a discrete cell on the surface of the terrain used for the discrete forward solution of the 3D Cauchy-type integral equations for the gravity and gravity gradient fields.

As illustrated in FIG. 7, we may divide each rectangular cell of the mesh into two triangles which would form the elementary cells $P_{Lk}$ (left triangular 44) and $P_{Rk}$ (right triangular 45). The corresponding equations of the plane parts, $F_{Lk}$ and $F_{Rk}$, of the surface F, located just above the cells $P_{Lk}$ and $P_{Rk}$ can be written using the equations of the plane through the corresponding points $\tilde{r}_{ij}, \tilde{r}_{i+1,j}, \tilde{r}_{i+1,j+1}$ and $\tilde{r}_{ij}, \tilde{r}_{i,j+1}, \tilde{r}_{i+1,j+1}$ for the left and right triangles, respectively:

$$(r - \tilde{r}_{ij}) \cdot [(\tilde{r}_{i+1,j} - \tilde{r}_{ij}) \times (\tilde{r}_{i+1,j+1} - \tilde{r}_{ij})] = 0 \qquad (17)$$

for $\Gamma_{Lk}$, and:

$$(r - \tilde{r}_{ij}) \cdot [(\tilde{r}_{i,j+1} - \tilde{r}_{ij}) \times (\tilde{r}_{i+1,j+1} - \tilde{r}_{ij})] = 0 \qquad (18)$$

for $\Gamma_{Rk}$. One can write an equivalent form of equation (12) as:

$$\alpha_{Lx}^{(k)} x + \alpha_{Ly}^{(k)} y + \alpha_{Lz}^{(k)} z + \alpha_{L0}^{(k)} = 0,$$

where:

$$a_{Lx}^{(k)} = \begin{vmatrix} 1 & y_{ij} & z_{ij} \\ 1 & y_{i+1,j} & z_{i+1,j} \\ 1 & y_{i+1,j+1} & z_{i+1,j+1} \end{vmatrix}$$

$$a_{Ly}^{(k)} = \begin{vmatrix} x_{ij} & 1 & z_{ij} \\ x_{i+1,j} & 1 & z_{i+1,j} \\ x_{i+1,j+1} & 1 & z_{i+1,j+1} \end{vmatrix}$$

$$a_{Lz}^{(k)} = \begin{vmatrix} x_{ij} & y_{ij} & 1 \\ x_{i+1,j} & y_{i+1,j} & 1 \\ x_{i+1,j+1} & y_{i+1,j+1} & 1 \end{vmatrix}$$

$$a_{L0}^{(k)} = \begin{vmatrix} x_{ij} & y_{ij} & z_{ij} \\ x_{i+1,j} & y_{i+1,j} & z_{i+1,j} \\ x_{i+1,j+1} & y_{i+1,j+1} & z_{i+1,j+1} \end{vmatrix}$$

Similarly, one may write an equivalent form of equation (18) as:

$$\alpha_{Rx}^{(k)} x + \alpha_{Ry}^{(k)} y + \alpha_{Rz}^{(k)} z + \alpha_{R0}^{(k)} = 0,$$

where:

$$a_{Rx}^{(k)} = \begin{vmatrix} 1 & y_{ij} & z_{ij} \\ 1 & y_{i,j+1} & z_{i,j+1} \\ 1 & y_{i+1,j+1} & z_{i+1,j+1} \end{vmatrix}$$

$$a_{Ry}^{(k)} = \begin{vmatrix} x_{ij} & 1 & z_{ij} \\ x_{i,j+1} & 1 & z_{i,j+1} \\ x_{i+1,j+1} & 1 & z_{i+1,j+1} \end{vmatrix}$$

$$a_{Rz}^{(k)} = \begin{vmatrix} x_{ij} & y_{ij} & 1 \\ x_{i,j+1} & y_{i,j+1} & 1 \\ x_{i+1,j+1} & y_{i+1,j+1} & 1 \end{vmatrix}$$

$$a_{R0}^{(k)} = \begin{vmatrix} x_{ij} & y_{ij} & z_{ij} \\ x_{i,j+1} & y_{i,j+1} & z_{i,j+1} \\ x_{i+1,j+1} & y_{i+1,j+1} & z_{i+1,j+1} \end{vmatrix}$$

One may introduce the following notations:

$$h_L^{(k)} = -[\alpha_{Lx}^{(k)} x_{Lk} + \alpha_{Ly}^{(k)} y_{Lk} + \alpha_{L0}^{(k)}]/\alpha_{Lz}^{(k)}, \qquad (19)$$

$$h_R^{(k)} = -[\alpha_{Rx}^{(k)} x_{Rk} + \alpha_{Ry}^{(k)} y_{Rk} + \alpha_{R0}^{(k)}]/\alpha_{Rz}^{(k)}, \qquad (20)$$

Where $(x_{Lk}, y_{Lk})$ and $(x_{Rk}, y_{Rk})$ denote the center of the cells $P_{Lk}$ and $P_{Rk}$ respectively. Substituting equations (19) and (20) into equation (5), one obtains:

$$b_{Lx}^{(k)} = \alpha_{Lx}^{(k)} / \alpha_{Lz}^{(k)},$$

$$b_{Ly}^{(k)} = \alpha_{Ly}^{(k)} / \alpha_{Lz}^{(k)},$$

$$b_{Rx}^{(k)} = \alpha_{Rx}^{(k)} / \alpha_{Rz}^{(k)},$$

$$b_{Ry}^{(k)} = \alpha_{Ry}^{(k)} / \alpha_{Rz}^{(k)}.$$

Using the discrete model parameters introduced above, and discrete gravity data, $g_\alpha(r')$, we may represent the 3D forward modeling operator for the gravity field of the density contrast surface $\Gamma$, equation 8, as:

$$g_\alpha(r') = \sum_{k=1}^{N_m} f_{L\alpha\gamma}^{(nk)} h_L^{(k)} b_{Ly}^{(k)} + \sum_{k=1}^{N_m} f_{R\alpha\gamma}^{(nk)} h_R^{(k)} b_{Ry}^{(k)}, \qquad (21)$$

where $$f_{L\alpha\gamma}^{(nk)} = -\gamma\rho_0 \Delta_{\alpha\beta\gamma\eta} \frac{\tilde{r}_{L\eta}^{(k)} - r_\eta^{(n)\prime}}{|\tilde{r}_{Lk} - r'_\eta|^3} \Delta x \Delta y,$$

$$f_{R\alpha\gamma}^{(nk)} = -\gamma\rho_0 \Delta_{\alpha\beta\gamma\eta} \frac{\tilde{r}_{R\eta}^{(k)} - r_\eta^{(n)\prime}}{|\tilde{r}_{Rk} - r'_\eta|^3} \Delta x \Delta y,$$

and:

$$\tilde{r}_{Lx}^{(k)} = x_{Lk},$$

$$\tilde{r}_{Ly}^{(k)} = y_{Lk},$$

$$\tilde{r}_{Lz}^{(k)} = h_L^{(k)} - H_0,$$

$$\tilde{r}_{Rx}^{(k)} = x_{Rk},$$

$$\tilde{r}_{Ry}^{(k)} = y_{Rk},$$

$$\tilde{r}_{Rz}^{(k)} = h_R^{(k)} = H_0,$$

$$\tilde{r}_x^{(n)\prime} = x_n',$$

$$\tilde{r}_y^{(n)\prime} = y_n',$$

$$\tilde{r}_z^{(n)\prime} = z_n'.$$

In a similar manner, one may derive expressions for the gravity gradients using equation (16).

The Cauchy integrals are evaluated independently for each data at each observation location. In one embodiment of the method, the Cauchy integrals can be evaluated on a grid with increasing discretization that is a function of distance from the observation location, and which may terminate at some distance from the observation location that is determined from the integrated sensitivity of the data with respect to the 3D density model.

EXAMPLE 1

Figure 8:
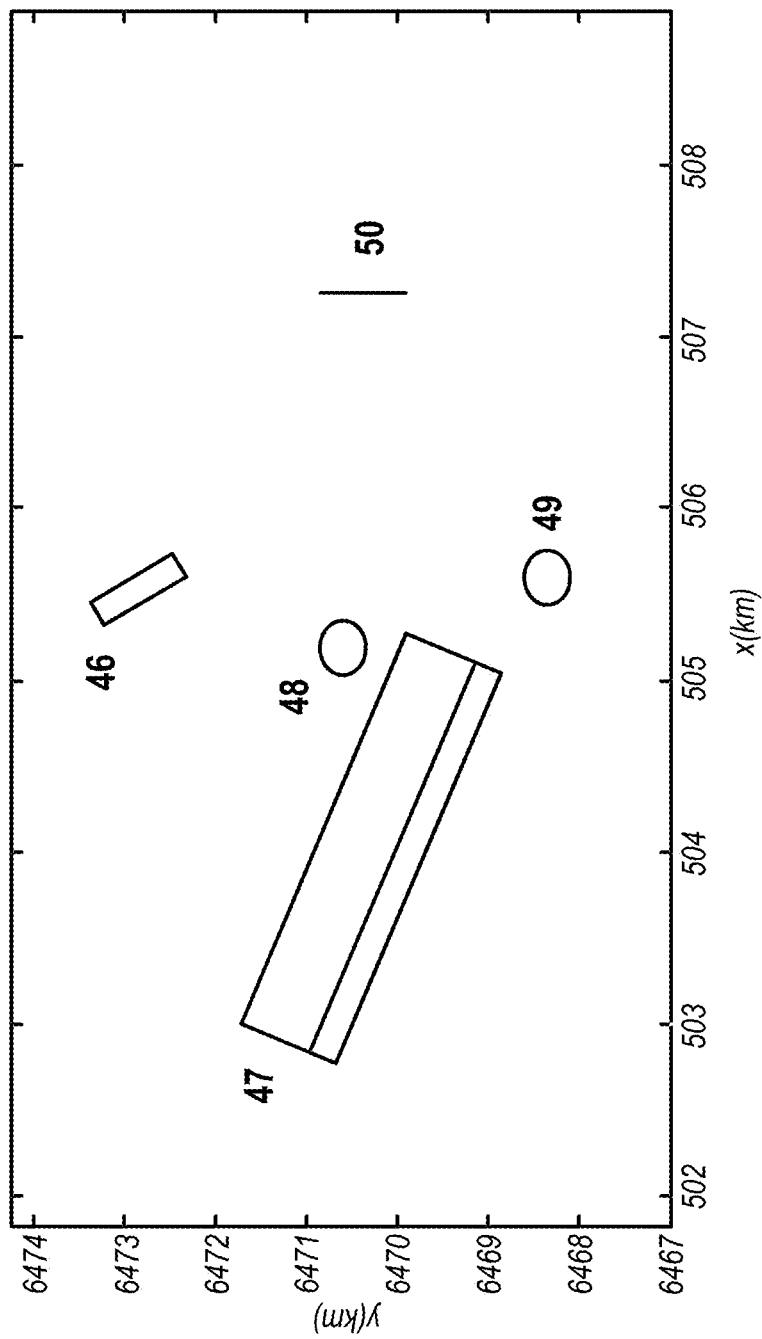
FIG. 8 illustrates the plan view of the anomalous bodies in a synthetic density model used to simulate gravity gradiometry data.

FIG. 8 is a plan view of five anomalous density bodies, including: a tabular block 46 of 0.20 g/cm³ density contrast buried at 500 m depth with a strike of 150°, strike length of 600 m, width of 200 m, and depth extent of 400 m; a dipping sheet 47 of 0.15 g/cm³ density contrast buried at 0 m depth with a dip of 75 m, dip of 45°, strike of 50°, strike length of 3000 m, and down-dip depth extent of 1000 m; a sphere 48 of 0.30 g/cm³ density contrast buried at 50 m depth with a radius of 150 m; a truncated cone 49 that narrows towards its base of −0.40 g/cm³ density contrast buried at 150 m depth with an upper radius of 100 m, a lower radius of 70 m, and a depth extent of 200 m; and a tunnel 50 of density contrast −2.7 g/cm³ buried at 3 m depth, with a width of 4 m, depth extent of 4 m, and a length of 500 m.

Figure 9:
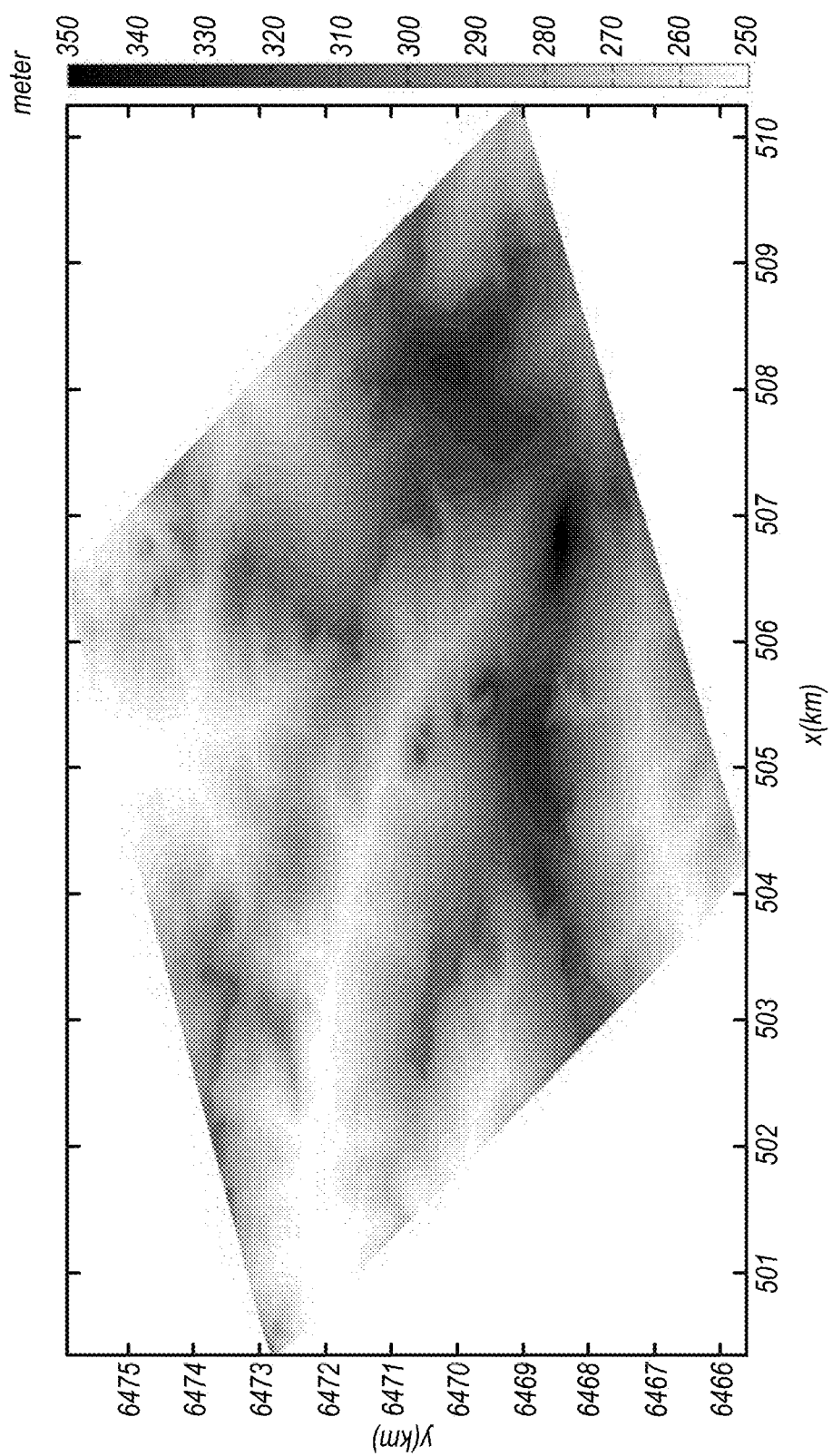
FIG. 9 illustrates the plan view of the LiDAR digital elevation model over the synthetic survey area.

FIG. 9 is a plan view of the digital elevation model as measured from a LiDAR survey over the synthetic survey area.

Figure 10:
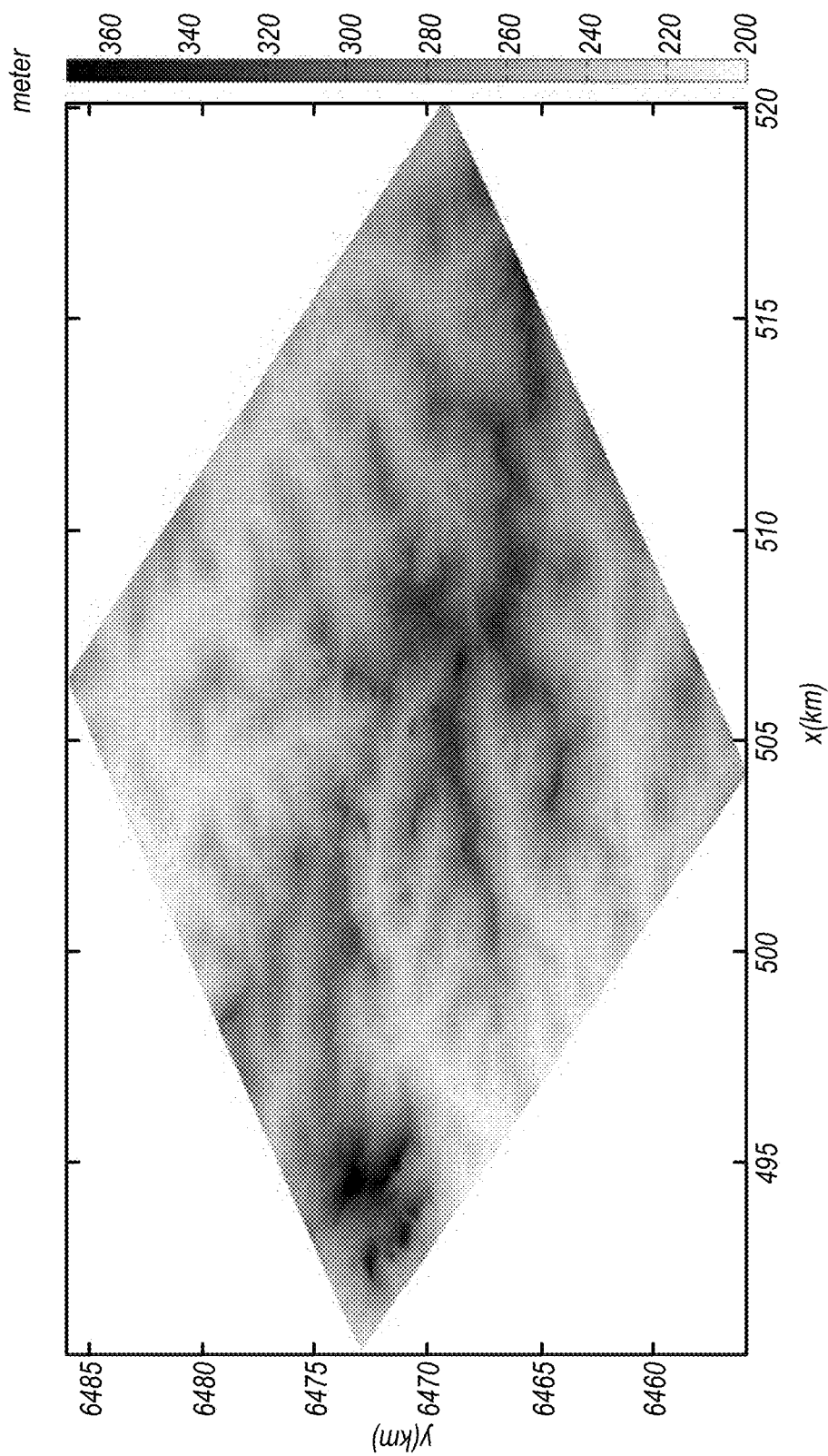
FIG. 10 illustrates the plan view of the LiDAR digital elevation model merged with the SRTM digital elevation model over the synthetic survey area used to simulate gravity gradiometry data.

FIG. 10 is a plan view of the digital elevation model as produced from the merging of the LiDAR digital elevation model over the synthetic survey area and the SRTM digital elevation model over a 10 km area beyond the synthetic survey area.

Figure 11:
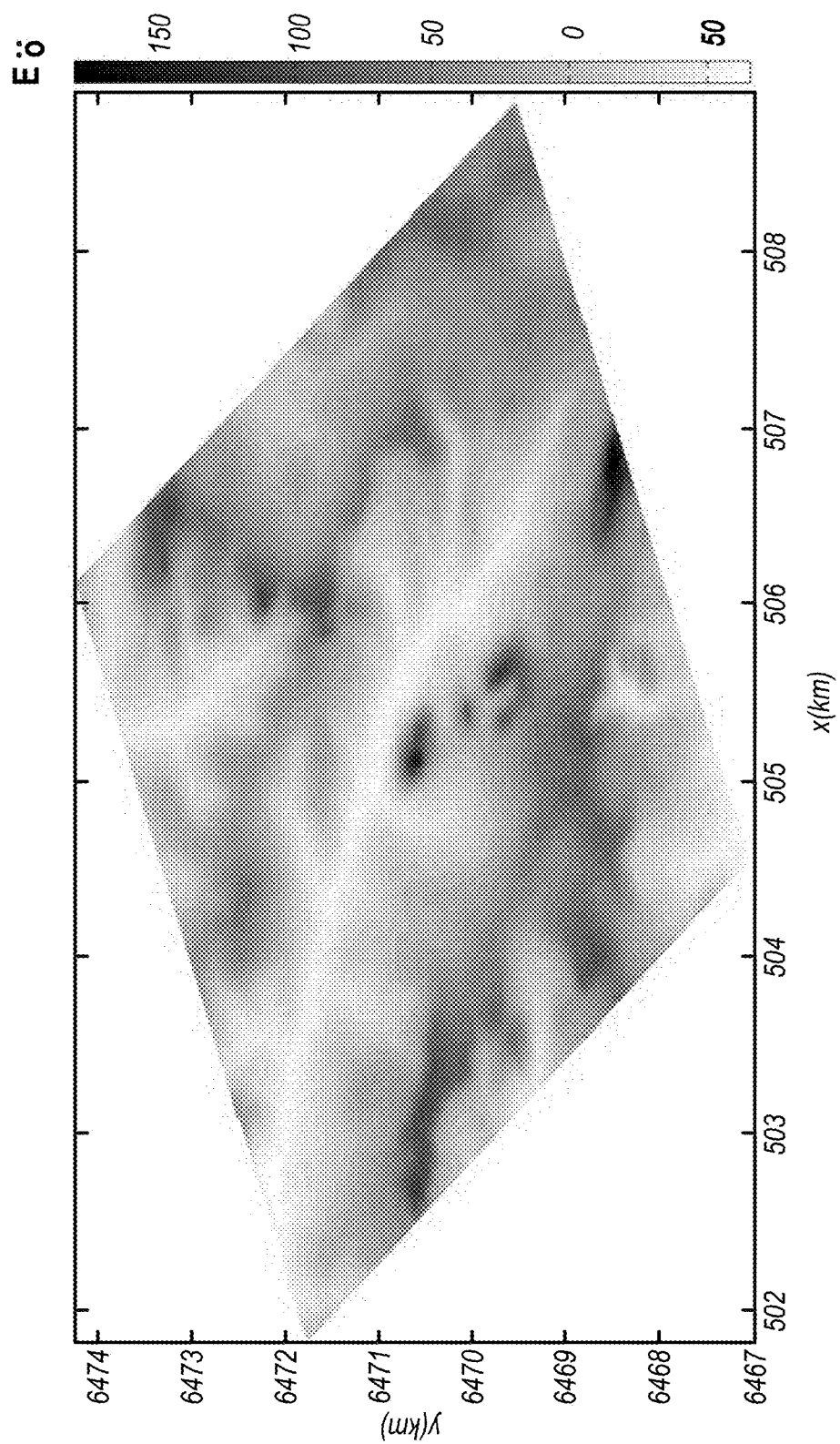
FIG. 11 illustrates the free-air vertical gravity gradient (Gzz) data simulated with 1 Eö/√Hz noise added for the synthetic density model and digital elevation model.

FIG. 11 is the free-air vertical gravity gradient (Gzz) data simulated with 1 Eö/√Hz noise added for the synthetic density model and digital elevation model with a homogeneous terrain density of 2.67 g/cm³.

Figure 12:
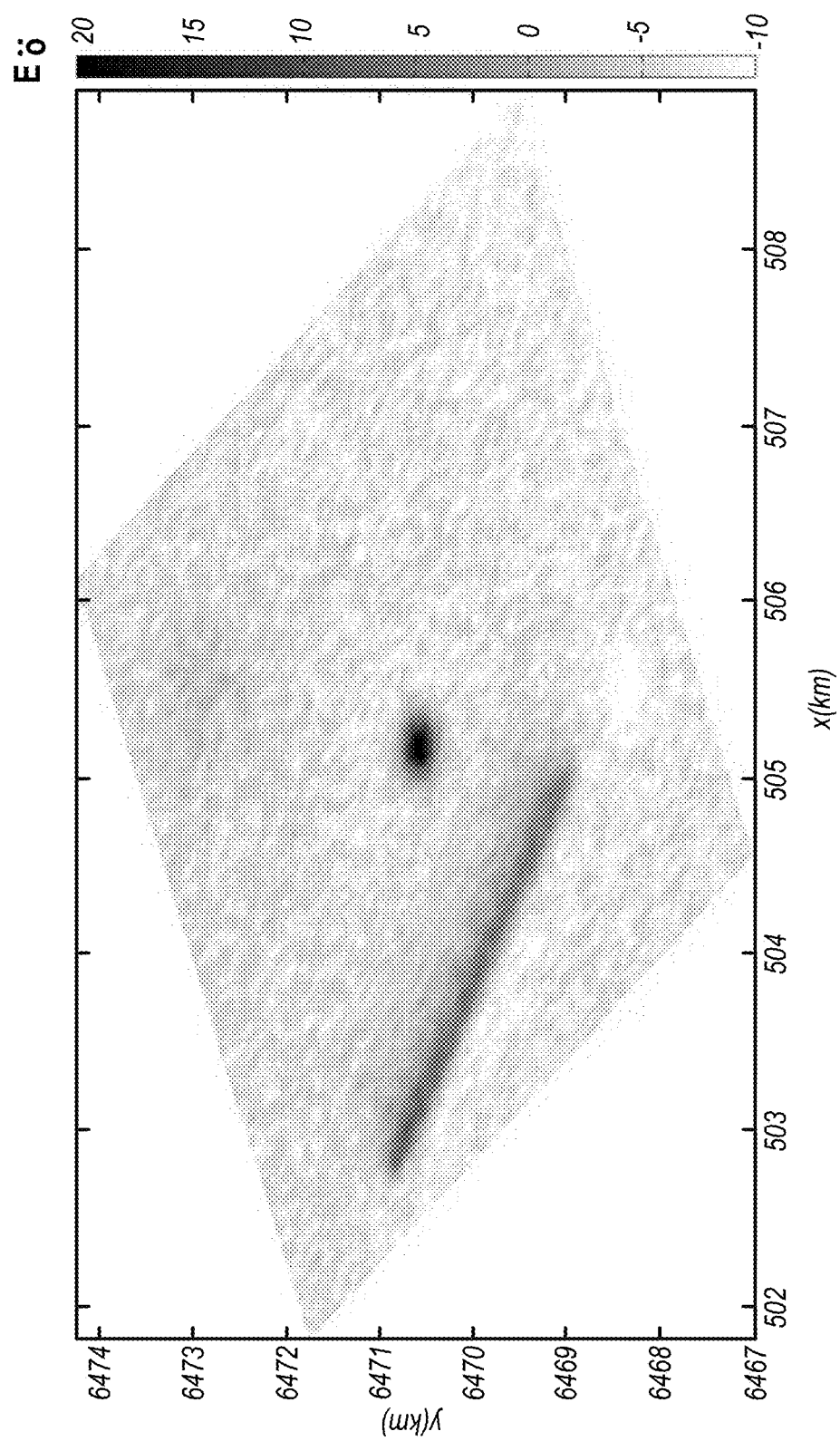
FIG. 12 illustrates the terrain corrected vertical gravity gradient (Gzz) data recovered from the synthetic free air vertical gravity gradient (Gzz) data and merged LiDAR and SRTM digital elevation models.

FIG. 12 is the terrain corrected vertical gravity gradient (Gzz) data obtained from terrain correction of the synthetic free air vertical gravity gradient (Gzz) data and merged LiDAR and SRTM digital elevation models with a homogeneous terrain density of 2.67 g/cm³.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical non-transitory storage media. Computer-readable media that carry computer-executable instructions are transmission media. Thus, by way of example, and not limitation, embodiments of the invention can comprise at least two distinctly different kinds of computer-readable media: physical non-transitory storage media and transmission media.

Physical non-transitory storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for terrain correction, the method comprising:
    a. measuring at least one component of the following: gravity scalar, gravity vector, gravity tensor, magnetic scalar, magnetic vector, and magnetic tensor data with at least one potential field sensor in at least one measurement position along at least one survey line;
    b. measuring a terrain as a digital elevation model;
    c. selecting a physical property function to describe a physical property distribution within the measured terrain;
    d. using at least one processor, forward modeling a terrain response from the digital elevation model with the physical property function for the measured at least one component of the following: gravity scalar, gravity vector, gravity tensor, magnetic scalar, magnetic vector, and magnetic tensor data using a 3D Cauchy-type surface integral over a surface of the terrain;
    e. using the at least one processor, filtering the forward modeled terrain response to match a system response and a data processing response of the at least one potential field sensor;
    f. using the at least one processor, calculating the filtered forward modeled terrain response for the measured at least one component of the following: gravity scalar, gravity vector, gravity tensor, magnetic scalar, magnetic vector, and magnetic tensor data;
    g. using the at least one processor, calculating a terrain corrected potential field data using the measured at least one component and the calculated filtered forward modeled terrain response; and
    h. using the terrain corrected potential field data for geophysical exploration of one or more geological areas.

2. The method of claim 1, wherein a physical property of the physical property function comprises one of density, susceptibility, and/or magnetization, representing the physical properties of the terrain containing the geological areas.

3. The method of claim 1, wherein the physical property function describing the physical property distribution within the terrain is an analytic function of space.

4. The method of claim 1, wherein the physical property function describing the physical property distribution within the terrain is constant.

5. The method of claim 1, wherein the physical property function describing the physical property distribution within the terrain may vary vertically according to a predetermined law.

6. The method of claim 1, wherein the at least one potential field sensor comprises a plurality of potential field sensors arranged in an array.

7. The method of claim 1, wherein an examined medium contains the geological areas.

8. The method of claim 1, further comprising:
    placing at least one potential field sensor in at least one measurement position in a survey.

9. A physical non-transitory computer readable medium having stored thereon computer executable instructions that when executed by at least one processor cause a computing system to perform a method for terrain correction, the method comprising:
    a. measuring at least one component of the following: gravity scalar, gravity vector, gravity tensor, magnetic scalar, magnetic vector, and magnetic tensor data with at least one potential field sensor in at least one measurement position along at least one survey line;
    b. measuring a terrain as a digital elevation model;
    c. selecting a physical property function to describe a physical property distribution within the measured terrain;
    d. forward modeling a terrain response from the digital elevation model with the physical property function for the measured at least one component of the following: gravity scalar, gravity vector, gravity tensor, magnetic scalar, magnetic vector, and magnetic tensor data using 3D Cauchy-type surface integral over a surface of the terrain;
    e. filtering the forward modeled terrain response to match a system response and a data processing response of the at least one potential field sensor;
    f. calculating the filtered forward modeled terrain response for the measured at least one component of the following: gravity scalar, gravity vector, gravity tensor, magnetic scalar, magnetic vector, and magnetic tensor data;
    g. calculating a terrain corrected potential field data using the measured at least one component and the calculated filtered forward modeled terrain response; and
    h. using the terrain corrected potential field data for geophysical exploration of one or more geological areas.

10. The method of claim 9, further comprising:
placing at least one potential field sensor in at least one measurement position in a survey.

11. A system for terrain correction comprising:
at least one potential field sensor; and
a computing system, the computing system comprising:
    at least one processor; and
    one or more physical non-transitory computer readable media having computer executable instructions stored thereon that when executed by the at least one processor, cause the computing system to perform the following:
        measure at least one component of the following: gravity scalar, gravity vector, gravity tensor magnetic scalar, magnetic vector, and magnetic tensor data with at least one potential field sensor in at least one measurement position along at least one survey line;
        measure a terrain as a digital elevation model;

select a physical property function to describe a physical property distribution within the measured terrain;

forward model a terrain response from the digital elevation model with the physical property function for the measured at least one component of the following: gravity scalar, gravity vector, gravity tensor, magnetic scalar, magnetic vector, and magnetic tensor data using 3D Cauchy-type surface integral over a surface of the terrain;

filter the forward modeled terrain response to match a system response and a data processing response of the at least one potential field sensor;

calculate the filtered forward modeled terrain response for the measured at least one component of the following: gravity scalar, gravity vector, gravity tensor, magnetic scalar, magnetic vector, and magnetic tensor data;

calculate a terrain corrected potential field data using the measured at least one component and the calculated filtered forward modeled terrain response; and use the terrain corrected potential field data for geophysical exploration of one or more geological areas.

12. The system of claim 11, wherein the physical properties comprise one of density, susceptibility, and/or magnetization, representing the physical properties of the terrain containing geological areas.

13. The system of claim 11, wherein the physical property function describing the physical property distribution within the terrain is an analytic function of space.

14. The system of claim 11, wherein the physical property function describing the physical property distribution within the terrain is constant.

15. The system of claim 11, wherein the physical property function describing the physical property distribution within the terrain may vary vertically according to a predetermined law.

16. The system of claim 11, wherein the at least one potential field sensor comprises a plurality of potential field sensors arranged in an array.

17. The system of claim 11, wherein an examined medium contains a geological area.

18. The system of claim 11, wherein the at least one potential field sensor is placed in at least one measurement position in a survey.

19. The system of claim 11 wherein the at least one potential field sensor comprises one or more of a gravimeter, a gravity gradiometer, a global positioning system (GPS), Laser Imaging Detection and Ranging (LIDAR) altimetry, radar altimetry, magnetometers, magnetic gradiometers, natural source electromagnetic systems, controlled-source electromagnetic systems, and spectrometers.

* * * * *